(12) United States Patent
Niu et al.

(10) Patent No.: US 10,722,333 B2
(45) Date of Patent: Jul. 28, 2020

(54) MEDIUM FOR A DENTAL STRUCTURE

(71) Applicant: City University of Hong Kong, Kowloon (HK)

(72) Inventors: Xinrui Niu, Kowloon (HK); Bing Chen, Kowloon (HK); Jian Lu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 14/835,870

(22) Filed: Aug. 26, 2015

(65) Prior Publication Data
US 2016/0184063 A1    Jun. 30, 2016

(30) Foreign Application Priority Data

Dec. 30, 2014    (CN) .......................... 2014 1 0841237

(51) Int. Cl.
| | |
|---|---|
| *A61C 13/10* | (2006.01) |
| *A61C 13/15* | (2006.01) |
| *A61C 5/30* | (2017.01) |
| *A61C 5/70* | (2017.01) |

(52) U.S. Cl.
CPC ............ *A61C 13/1026* (2013.01); *A61C 5/30* (2017.02); *A61C 5/70* (2017.02); *A61C 19/003* (2013.01)

(58) Field of Classification Search
CPC ................................ A61K 6/0073; A61C 5/30
See application file for complete search history.

(56) References Cited

U.S. PATENT DOCUMENTS

| | | | | |
|---|---|---|---|---|
| 6,730,156 | B1 * | 5/2004 | Windisch | A61K 6/0017 106/35 |
| 2008/0160206 | A1 * | 7/2008 | Burtscher | A61K 6/0073 427/450 |
| 2011/0046260 | A1 * | 2/2011 | Okubayashi | A61K 6/083 523/115 |
| 2011/0081627 | A1 * | 4/2011 | Sun | A61C 13/0003 433/199.1 |
| 2014/0206791 | A1 * | 7/2014 | Schuhmacher | A61K 6/083 522/172 |

* cited by examiner

*Primary Examiner* — Michael F Pepitone
(74) *Attorney, Agent, or Firm* — Renner Kenner Greive Bobak Taylor & Weber

(57) ABSTRACT

A medium for a dental structure includes a first portion having a first physical property arranged to connect with a first dental component of the dental structure; and a second portion having a second physical property arranged to connect with a second dental component of the dental structure, wherein the combination of the first portion and the second portion is arranged to minimize stress established between the first dental component and/or the second dental component when the first dental component combines with the second dental component.

5 Claims, 9 Drawing Sheets

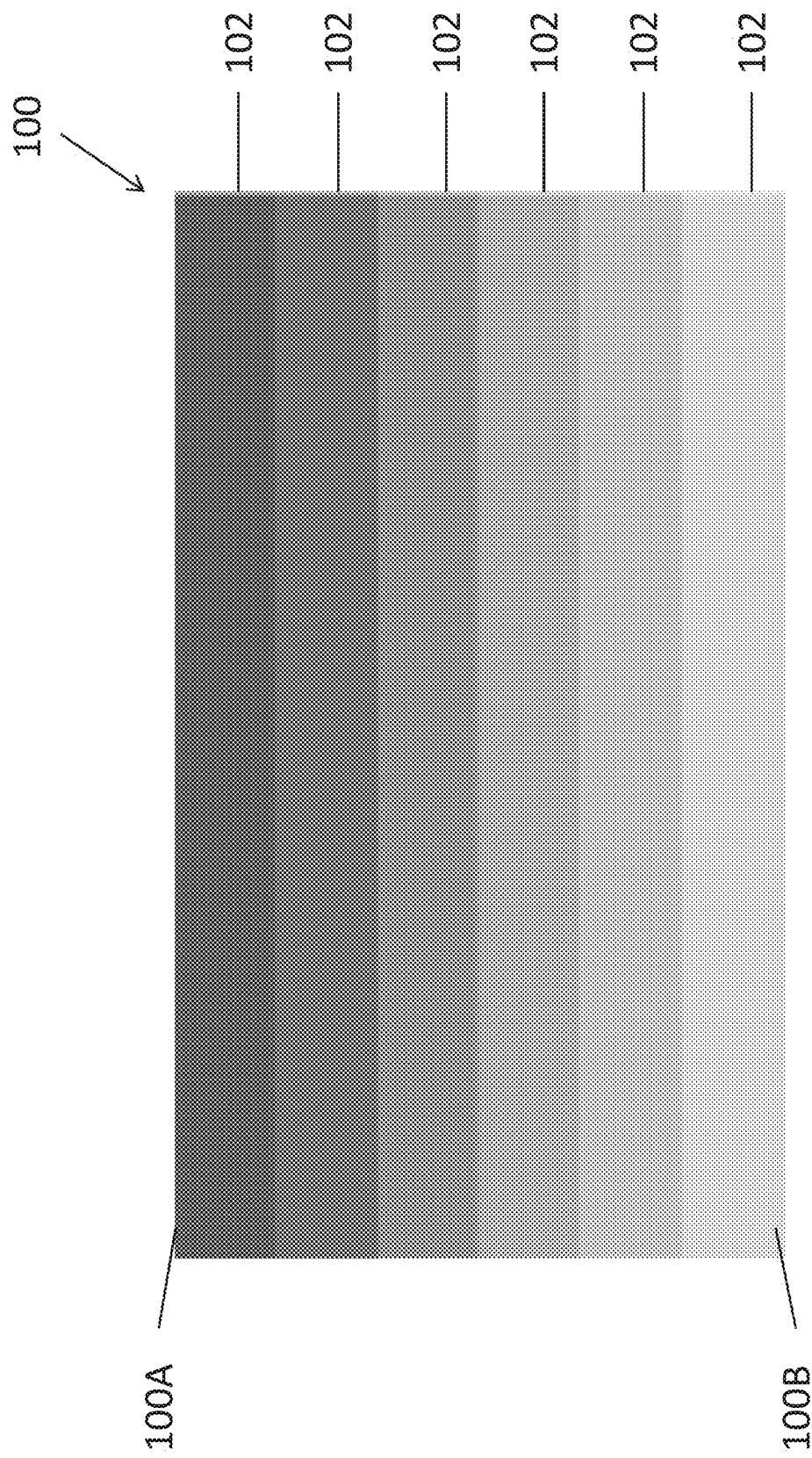

MEDIUM FOR A DENTAL STRUCTURE

CROSS-REFERENCE TO RELATED APPLICATIONS

The present application is a Non-Provisional utility patent application, which claims priority to Chinese patent application number 201410841237.2, filed Dec. 30, 2014, all prior filings being incorporated herein by reference.

TECHNICAL FIELD

The present invention relates to a medium for a dental structure, and particularly, although not exclusively, to a layered dental structure for using in the dental restoration.

BACKGROUND

A dental structure such as a tooth usually comprises different dental components. These dental components include different physical and mechanical properties. For example, the outermost enamel layer is harder than the inner dentin layer. In a restorative dental structure or a repaired tooth, ceramic structure may be used to replace or repair a damaged enamel layer.

A dental medium which is biological compatible may be used to serve as a substrate to support the ceramic dental components (as a hard dental component for replacing the outermost enamel layer) to the dentin layer or polymeric composites in a restorative dental structure. Typically a dental medium assists with dental cement on both sides sufficient for attaching dental components such that the ceramic dental components may be firmly attached to the underneath dentin layer (polymeric composites substrate) or enamel layer.

SUMMARY OF THE INVENTION

In accordance with a first aspect of the present invention, there provided a medium for a dental structure comprising: a first portion having a first physical property arranged to connect with a first dental component of the dental structure with or without dental cement; and a second portion having a second physical property arranged to connect with a second dental component of the dental structure with or without dental cement; wherein the combination of the first portion and the second portion is arranged to minimize stress concentration established in the first dental component and/or the second dental component when the first dental component combines with the second dental component.

In an embodiment of the first aspect, the medium is arranged to act as a stress-releasing layer between the first dental component and the second dental component.

In an embodiment of the first aspect, the medium is arranged to inhibit and deviate the growth of cracks and/or fissures in the first dental component.

In an embodiment of the first aspect, the medium is a thick block or a thin film.

In an embodiment of the first aspect, further comprising at least two layers of materials defining the first portion and the second portion.

In an embodiment of the first aspect, the physical property of the first portion is different from the second portion.

In an embodiment of the first aspect, the first physical property gradually changes to the second physical property from a thickness across the first portion to the second portion.

In an embodiment of the first aspect, the first physical property and the second physical property include at least one of Young's modulus, hardness, mechanical strength, thickness and density.

In an embodiment of the first aspect, further comprising a polymeric composite.

In an embodiment of the first aspect, the polymeric composite comprises a polymeric material including at least one of bis-GMA, TEGDMA, epoxy, and resin-based polymer.

In an embodiment of the first aspect, the polymeric composite further comprises inorganic fillers.

In an embodiment of the first aspect, the inorganic fillers are arranged to modify the first physical property and/or the second physical property of the medium.

In an embodiment of the first aspect, the inorganic fillers are arranged to strengthen the medium such that the medium is arranged to carry a higher stress established thereon, to reduce deformation of the polymeric composite, and/or to inhibit and deviate the propagation of cracks or fissures in the polymeric composite.

In an embodiment of the first aspect, the inorganic filler includes at least one of silicon nitride, silicon carbide, silica, zirconia, alumina, titania, silver, chlorhexidine, ytterbium trifluoride, calcium fluoride, calcium phosphate, calcium silicate, dicalcium phosphate anhydrous, and hydroxyapatite.

In an embodiment of the first aspect, the inorganic filler includes at least one shape of a sphere, a whisker, a platelet, a tube, a fiber and a rod.

In an embodiment of the first aspect, the inorganic filler includes a dimension in a range from 5 nm to 200 μm.

In an embodiment of the first aspect, the medium comprises a range of weight % of 0-90% of the inorganic fillers.

In an embodiment of the first aspect, the medium includes a range of thickness of 5 μm to 2 mm.

In an embodiment of the first aspect, the first dental component includes a ceramic dental structure.

In an embodiment of the first aspect, the second dental component includes dentin layer of and/or a dental filling material in the dental structure.

In accordance with a second aspect of the present invention, there is provided a method of producing a medium for a dental structure in accordance with the first aspect, comprising the steps of: mixing the inorganic fillers with the polymeric material to form the polymeric composite; depositing the polymeric composite to form a layer of the medium; and curing the deposited layer of the medium.

In an embodiment of the second aspect, further comprising the steps of repeating the steps to deposit at least one additional layer of the medium on top of the layer of the medium deposited at the bottom.

In an embodiment of the second aspect, further comprising the step of treating the inorganic fillers with a surface modifier prior to the step of mixing the inorganic fillers with the polymeric material to form the polymeric composite.

In an embodiment of the second aspect, the inorganic fillers and the polymeric material are mixed by at least one of a high speed disperser, a three-roller miller and ultrasound homogenizer.

In an embodiment of the second aspect, further comprising the step of degassing the mixture for 0 to 96 hours prior to the step of depositing the polymeric composite to form a layer of the medium.

In an embodiment of the second aspect, the polymeric composite includes a resin having a high strength property with at least one of a photon-curing, a heat-curing and a self-curing property.

BRIEF DESCRIPTION OF THE DRAWINGS

Embodiments of the present invention will now be described, by way of example, with reference to the accompanying drawings in which:

FIG. 1 is a cross-sectional illustration of a medium for a dental structure in accordance with an embodiment of the present invention;

DETAILED DESCRIPTION OF THE PREFERRED EMBODIMENT

Figure 2A:
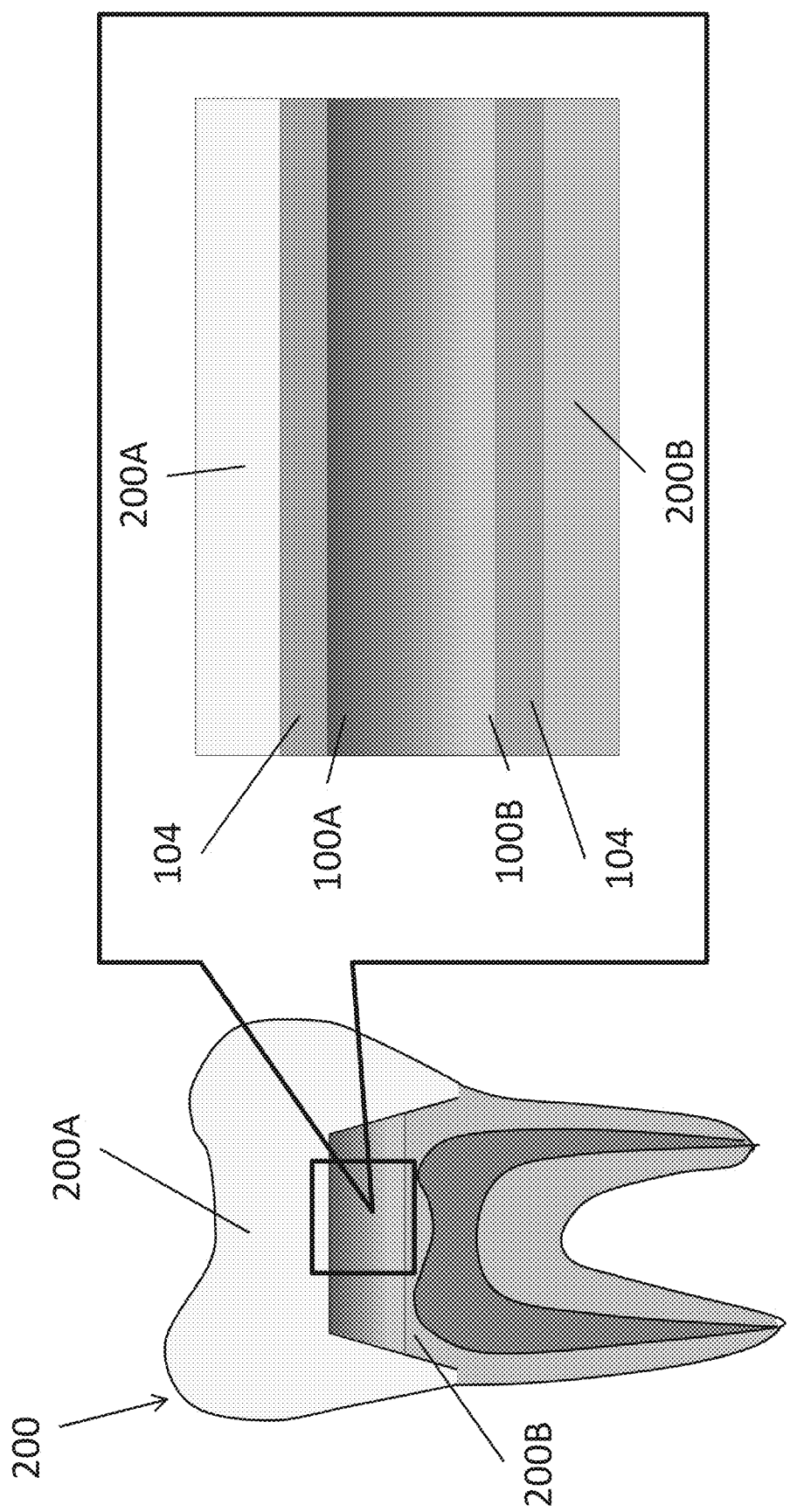
FIG. 2A is a cross-sectional illustration of a dental structure with a medium for a dental structure of FIG. 1.

With reference to FIG. 1, there is provided an example embodiment of a medium 100 for a dental structure 200 comprising: a first portion 100A having a first physical property arranged to connect with a first dental component 200A of the dental structure 200; and a second portion 100B having a second physical property arranged to connect with a second dental component 200B of the dental structure 200; wherein the combination of the first portion 100A and the second portion 100B is arranged to minimize stress established between the first dental component 200A and/or the second dental component 200B when the first dental component 200A combines with the second dental component 200B.

In this embodiment, the medium 100 is between the first dental component 200A and the second dental component 200B of the dental structure 200. For example, in a restoration dental structure 200, preferably, the first dental component includes a ceramic dental structure 200A, whereas the second dental component includes dentin layer 200B, a dental filling material, or a (restoration) dental structure with a combination of dentin layer and a dental filling material. Alternatively, the medium 100 may be used between any dental components such as enamel layer, dental cement, or any other restoration components in a dental structure.

Preferably, the medium 100 is a thick block or a thin film, and it includes a plurality of layers 102. As shown in FIG. 1, the medium 100 includes six layers 102, wherein the top layer may be considered as a first portion 100A of the medium 100, and the bottom layer may be considered as a second portion 100B of the medium 100. In an alternatively embodiment, the medium 100 may comprise at least two layers of material, or the medium 100 has gradually changed or gradient physical characteristics. The top layer 100A of the medium 100 has a first physical property, whereas the bottom layer 100B has a second physical property, and in an exemplary gradient configuration, the first physical property of the top layer 100A gradually change to the second physical property of the bottom layer 100B from a thickness across the first portion 100A to the second portion 100B. The top layer may be configured to a first dental component such as a ceramic dental component 200A in a dental structure 200, and the bottom layer may be configured to connect with the dentin layer 200B of the dental structure 200.

Ceramic dental component 200A and the dentin layer 200B have very different physical and/or mechanical properties, including Young's modulus, hardness, mechanical strength and/or density. When materials with different physical or mechanical properties connect directly or indirectly, stress is established in these structures or at the connecting interface. Stress concentration will be established under the influences of external forces, and excessive stress may cause the generation of cracks or fissures in these structures, or the propagation of the existing cracks or fissures in these structures. As a result, these structures may be damaged or even destroyed.

Preferably, the medium 100 is arranged to include different physical properties at the top layer 100A and the bottom layer 100B. For example, the first physical property is different from the second physical property. The top layer 100A or the first portion 100A of the medium 100 may be optimized to have a first physical property which is suitable for connecting a harder first dental component 200A (such as a ceramic dental component) of the dental structure 200, whereas the bottom layer 100B or the second portion 100B of the medium 100 may be optimized to have a second physical property which is suitable for connecting a softer second dental component 200B (such as the dentin layer) of the dental structure 200. Different layers may have different physical properties, such as Young's modulus, hardness, mechanical strength and/or density mentioned above. By matching different physical properties of the layer that connects with different dental components, the medium 100 may be arranged to act as a stress-releasing layer between the first dental component 200A and the second dental component 200B. Therefore, different physical properties of different dental components may be changed gradually by the medium 100 in between.

Preferably, the medium 100 is arranged to inhibit and deviate the growth of cracks and/or fissures in the first dental component 200A (such as a ceramic dental component). By matching different physical properties of the layer that connects with different dental components, the difference of the physical properties between the connecting layer 102 and the dental component is minimized. When the first dental component 200A is combined with the second dental component 200B (for example during chewing), the medium may effectively minimize or release the stress established in the first dental component 200A, such that cracks existing (when a ceramic dental component is manufactured) within the first dental component 200A from growing as a result of ineffective release of stress established in the first dental structure 200A due to excessive physical properties mismatch between the first dental component 200A and the connecting medium 100. Similarly, a second portion 100B of the medium 100 having identical or similar physical properties may be arranged to effectively minimize or release the stress established in the second dental component 200B. Therefore, the combination of the first portion 100A and the second portion 100B may be arranged to minimize stress established between the first dental component 200A and/or the second dental component 200B when the first dental component 200A combines with the second dental component 200B.

Figure 2B:
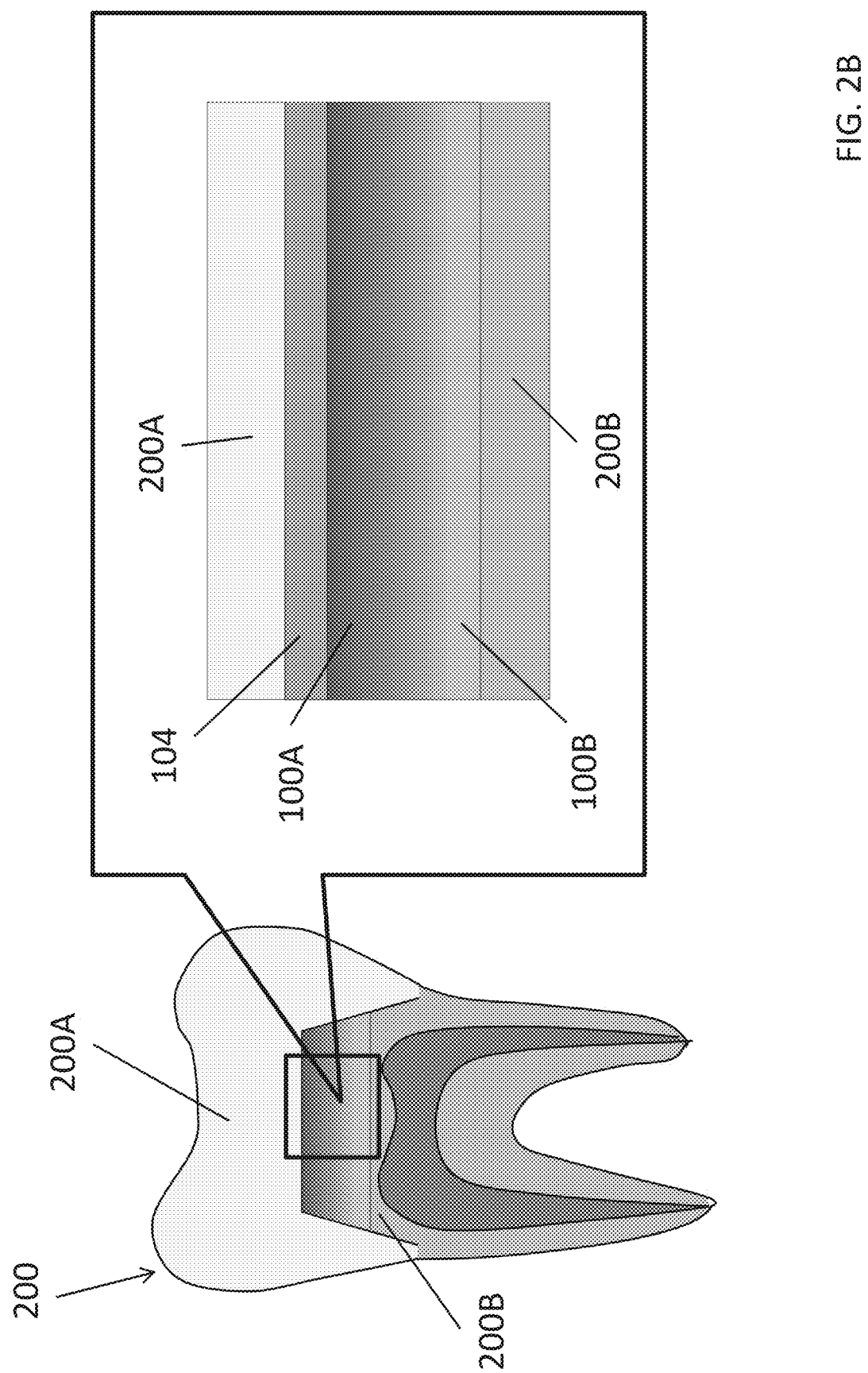
FIG. 2B is a cross-sectional illustration of a dental structure with a medium of FIG. 1 in another configuration.
Figure 2C:
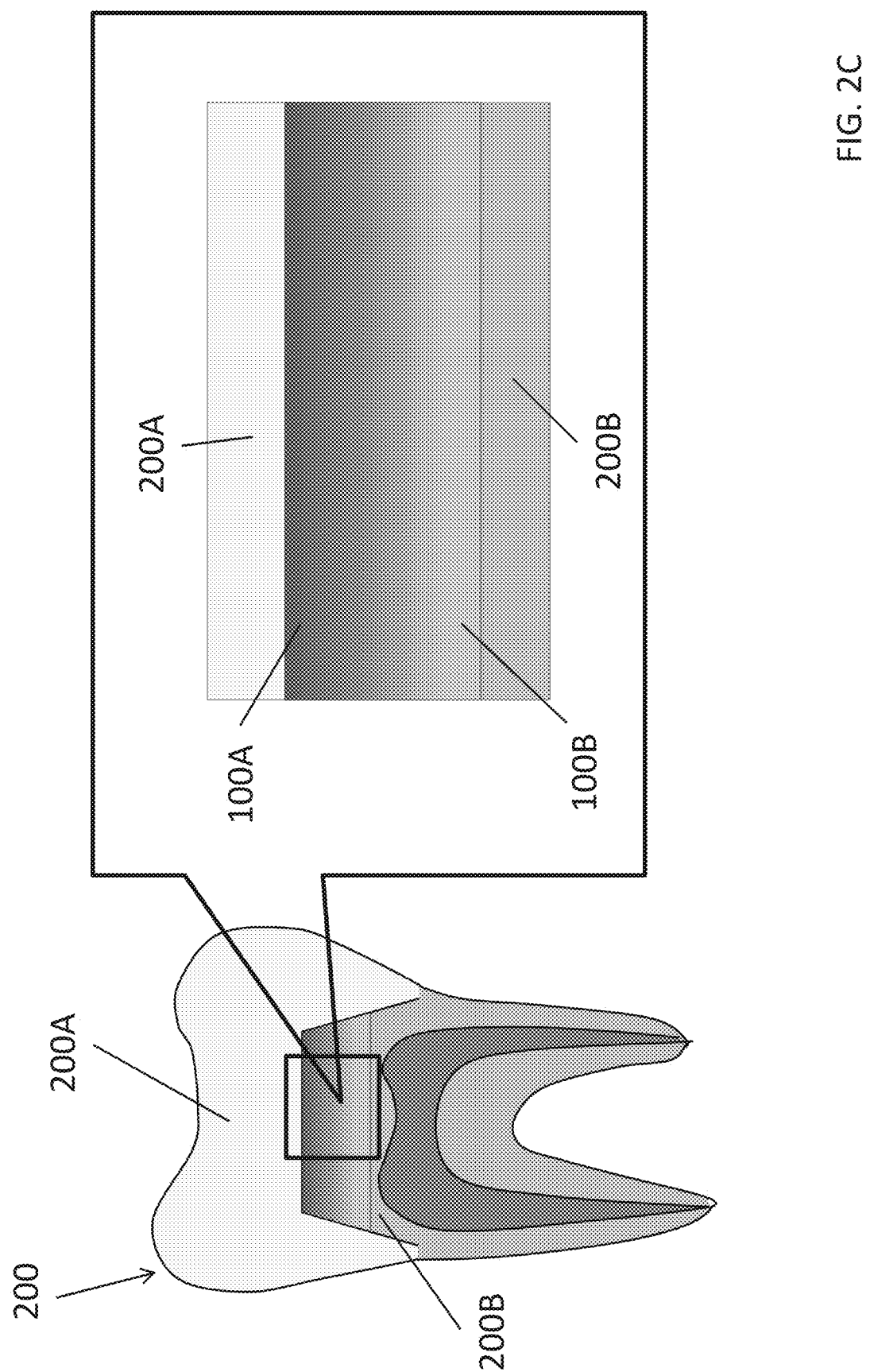
FIG. 2C is a cross-sectional illustration of a dental structure with a medium of FIG. 1 in another configuration.
Figure 3:
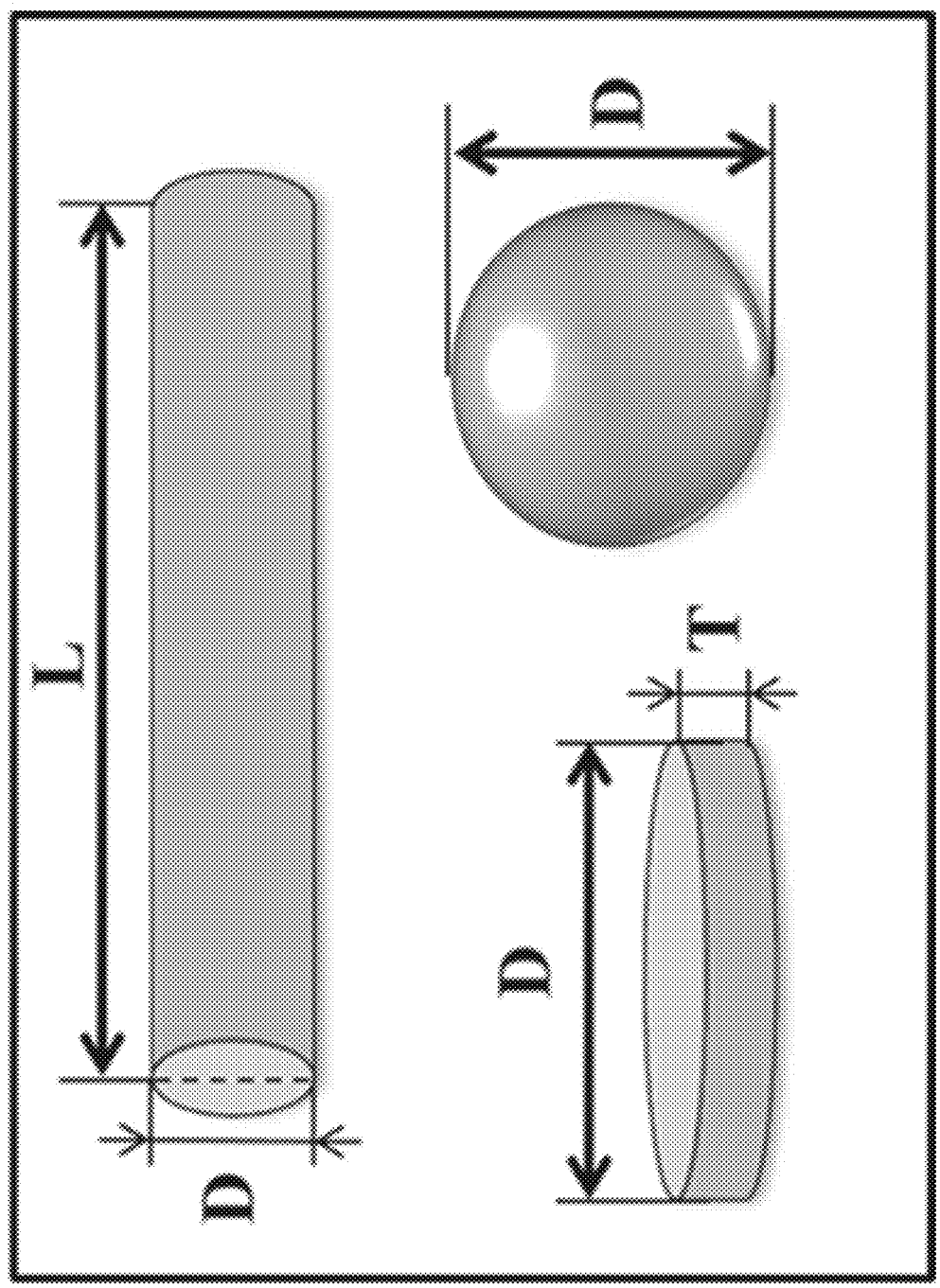
FIG. 3 is an illustration of examples of the shapes of the inorganic fillers included in the medium of FIG. 1.

With reference to FIGS. 2A to 2C, the medium 100 for a dental structure 200 includes a range of thickness of 5 µm to 2 mm. According to different configurations, the medium 100 may connect or attach to different dental components in a dental structure 200, such as a restorative dental structure.

Referring to FIG. 2A, the medium may not include any adhesive surfaces. For example, the first portion 100A (the top layer) is arranged to connect with a first dental component 200A (a ceramic dental component) of the dental structure 200 by dental cement 104; and the second portion 100B (the bottom layer) is arranged to connect with a second dental component 200B (dentin layer or dental filling materials) of the dental structure 200 by dental cement 104.

Alternatively, the medium 100 may only include one single adhesive surface. As shown in FIG. 2B, the first portion 100A (the top layer) of the medium 100 connects to the first dental component 200A (a ceramic dental component) via a dental cement 104; and the second portion 100B of the medium 100 may adhere to a second dental component 200B (dentin layer or dental filling materials) of a dental structure 200 directly.

In some other example embodiments, as shown in FIG. 2C, the medium 100 may comprises two adhesive surfaces or layers, such that the first portion 100A (the top layer) of the medium 100 may adhere to a first dental component 200A (a ceramic dental component) of a dental structure 200 directly, and the second portion 100B of the medium 100 (the bottom layer) may adhere to a second dental component 200B (dentin layer or dental filling materials) of a dental structure 200 directly. Optionally, the medium 100 having one or more adhesive surfaces may also connect to different dental components via additional dental adhesive 104.

Preferably, the medium 100 may comprise a polymeric composite, this may include bisphenol A-glycidyl methacrylate (bis-GMA), triethyleneglycol-dimethacrylate (TEGDMA), epoxy, and/or a resin-based polymer, alternatively, the medium 100 may comprises a dental adhesive or a polymeric material such as but not limited to urethane dimethacrylate (UDMA) or 2-Hydroxyethyl methacrylate (HEMA) as known in the art.

Optionally, the polymeric composite of the medium 100 may comprise inorganic fillers. This may include silicon nitride, silicon carbide, silica, zirconia, alumina, titania, silver, chlorhexidine, ytterbium trifluoride, calcium fluoride, calcium phosphate, calcium silicate, dicalcium phosphate anhydrous, and/or hydroxyapatite, and has a shape of a sphere, a whisker, a platelet, a tube, a fiber and/or a rod. The inorganic fillers are arranged to change or modify the physical properties such as Young's modulus, hardness, mechanical strength and/or density of the polymeric composite. By mixing different types and ratios of inorganic fillers with the polymeric materials, preferably in a range of weight % of 0-90% of inorganic fillers in different portions or layers 102 of the medium 100, and different shapes and/or sizes of inorganic fillers, preferably having a dimension in a range from 5 nm to 200 µm (such as a diameter (D) of the tube/rod/particulate/platelet, a length (L) or the tube/rod and the thickness (T) of the platelet), the physical properties of different portions or layers 102 of the medium may be modified to different first and/or second physical properties. Advantageously, the inorganic fillers may strengthen the medium 100/the layer 102/the polymeric composite such that the medium 100 may carry a higher stress established thereon, reduce deformation of the polymeric composite/the layer 102, and/or inhibit and deviate a propagation of cracks or fissures in the polymeric composite/the layer 102.

Figure 4:
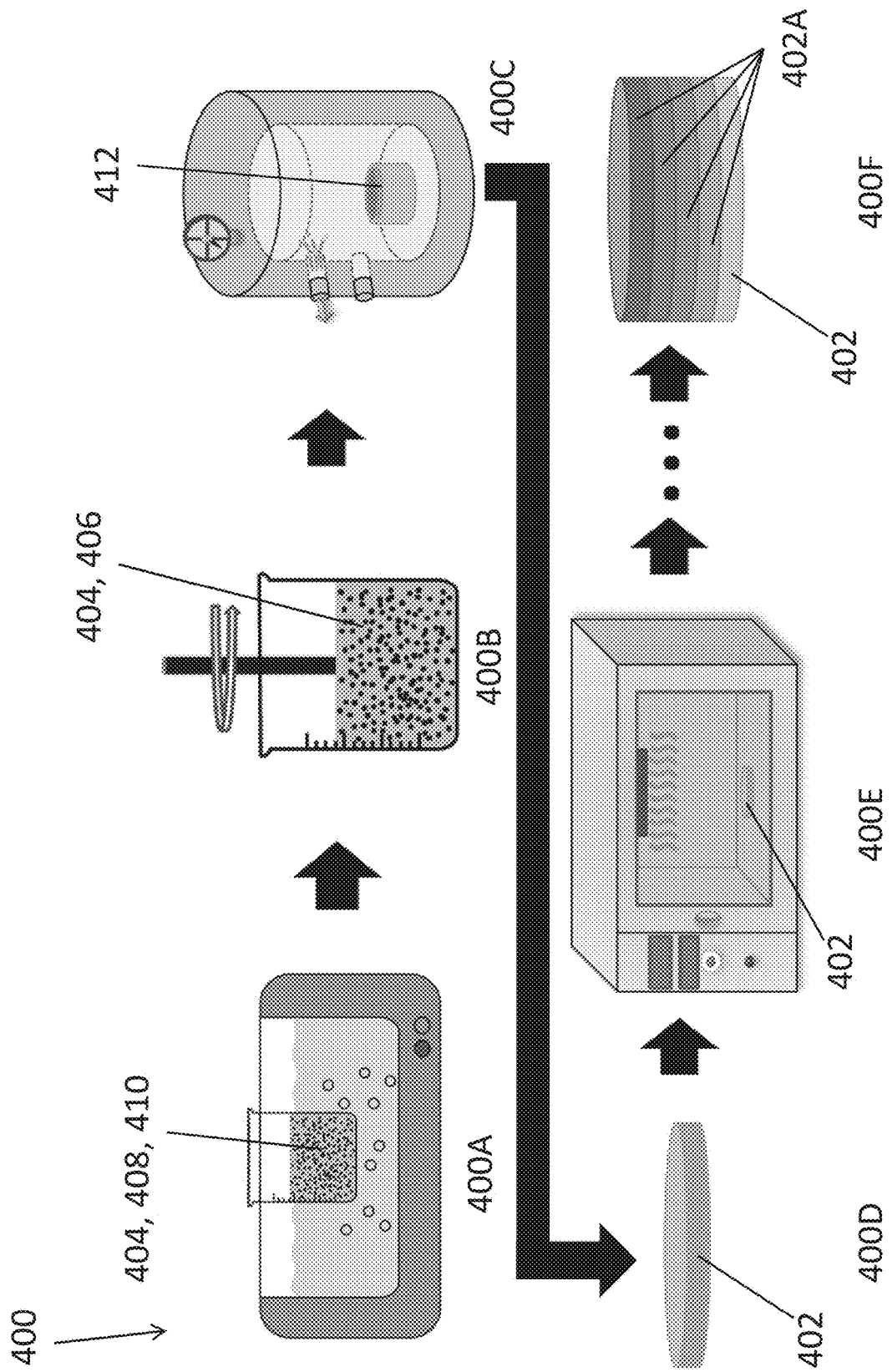
FIG. 4 is a process flow diagram showing the method of producing the medium of FIG. 1.

With reference to FIG. 4, an embodiment of a method 400 of producing a medium 100 is provided for a dental structure 200, comprising the steps of: mixing the inorganic fillers 404 with the polymeric material 406 to form the polymeric composite 412; depositing the polymeric composite to form a layer of the medium 402; and curing the deposited layer of the medium 402.

Preferably, the inorganic fillers 404 and the polymeric material 406 may be mixed by a high speed disperser, a three-roller miller and/or ultra-sound homogenizer. In an example embodiment, the method 400 includes a step of treating the inorganic fillers 404 with a surface modifier 408 prior to the step of mixing the inorganic fillers 404 with the polymeric material 406 to form the polymeric composite 412, such that the surface characteristics/conditions of the inorganic fillers 404 may be modified. Preferably, this may involve mixing and/or using ultra-sonication (process 400A) to mix the inorganic fillers 404 with a surface modifier 408 (and the carrier solvent 410), such that the inorganic fillers 404 may distribute/disperse evenly within the polymeric material 406 or the polymeric composite 412. The modified inorganic fillers 404 may comprise an increased wettability so as to facilitate the manufacturing process of the medium 100.

Preferably, after mixing of the inorganic fillers 404 and the polymeric material 406, the polymeric composite 412 is produced. The mixture or the polymeric composite 412 may be degassed in process 400C. The mixture or polymeric composite 412 may be placed in a low pressure or a vacuum environment for a predetermined period, preferably 0 to 96 hours. Air or any other gases introduced to the mixture or composite 412 during mixing (such as process 400B) the inorganic fillers 404 and the polymeric material 406 will be extracted to the environment due to a negative pressure. Advantageously, a bubble minimized composite 412 could be obtained. This will enhance mechanical and physical properties of the layer 102 or the medium 100 deposited with the degassed polymeric composite 412.

Polymeric composite 412 may then be deposited as a layer of the medium 402 (process 400D), and the layer of the medium 402 may be further cured in process 400E. Depending on the material of the layer of the medium 402, which is the composition of the mixture/polymeric composite 412, for example, the polymeric composite may be consisted a resin having a high strength property with a heat-curing, a photon-curing and/or a self-curing property Accordingly, different methods may be applied to cure the layer of the medium 402 such as using a hot plate, an oven, a light source with a particular light spectrum.

According to different structure of the medium 100 (such as the medium as shown in FIG. 1 having 6 layers 102 or any other numbers of layer 102), the above method for producing the medium 100 (process 400A to 400E) may be repeated at predetermined times to deposit at least one additional layer of the medium 402A on top of the layer of the medium 402 deposited at the bottom. Among different layers 102, parameters such as the composition of the polymeric composite 412 (such as the mixing ratio of the inorganic fillers 404 and the polymeric material 406), the process condition of the surface treatment of the inorganic fillers 404, the mixing condition, the degassing condition, the deposition condition, the depositing thickness, the curing condition etc. may be changed depending on different structures, so as to produce layers 102 with different physical properties. Optionally, curing may be carried out after every single layers (402, 402A) being deposited or after multiple layers (402, 402A) being deposited.

Figure 5A:
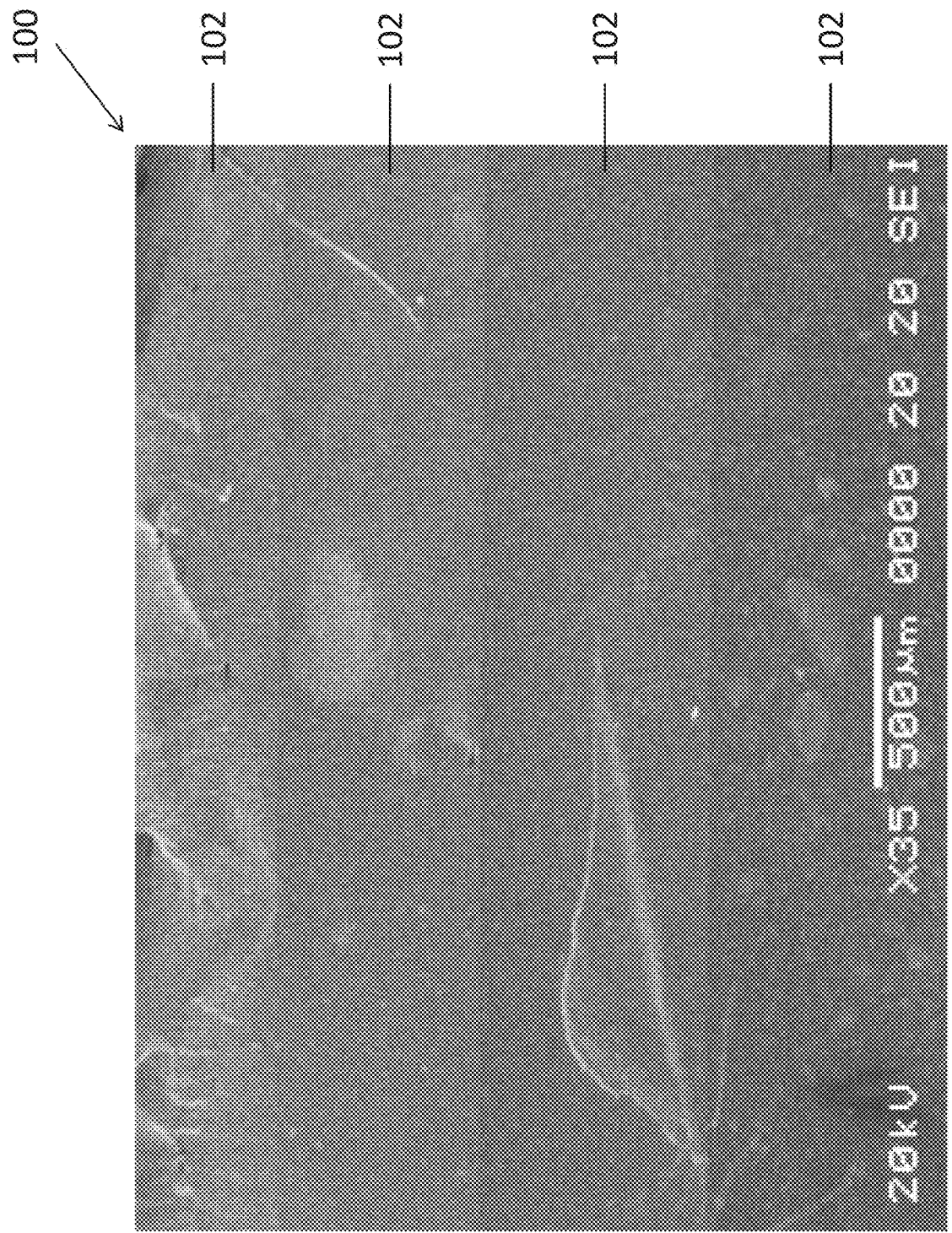
FIG. 5A is a microscopic image of the medium of FIG. 1.
Figure 5B:
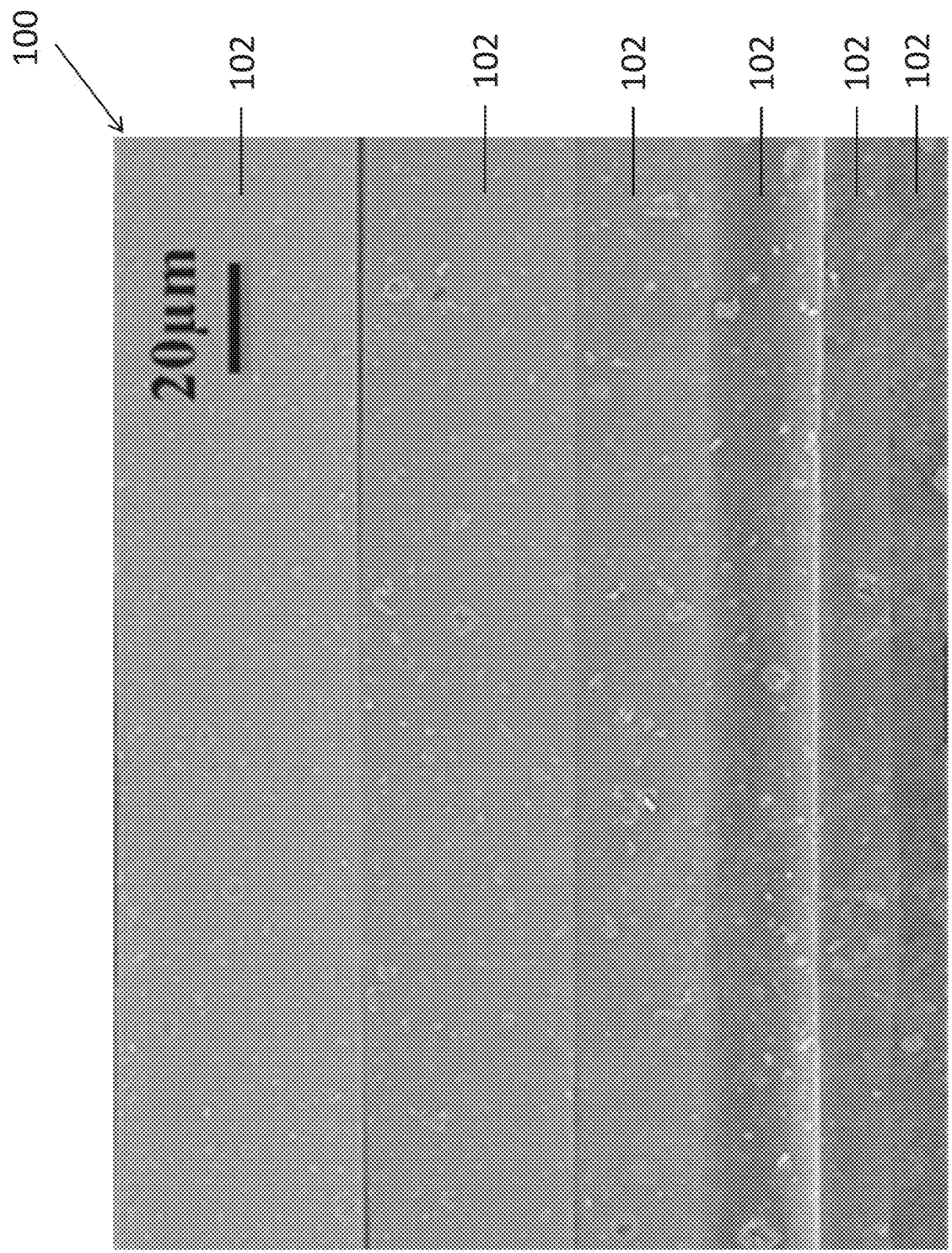
FIG. 5B is a microscopic image of the medium of FIG. 1 in another configuration.

With reference to FIGS. 5A and 5B, there show two scanning electron microscopy (SEM) images of cross-section of the medium 100 for a dental structure in accordance with an embodiment of the present invention. Referring to FIG. 5A, the medium 100 is a thick block. It comprises four connecting layers 102 with clear interfaces. Each of the layers 102 has a thickness in a range of about 0.5-0.7 mm. The total thickness of the medium 100 is about 2.5 mm.

Alternatively, the medium 100 may be a thin film. As shown in FIG. 5B, there shows a scanning electron microscopy (SEM) image of a cross-section of the medium 100 for a dental structure in accordance with an embodiment of the present invention. The medium 100 comprises six connecting layers 102 with clear interfaces. Each of the layers 102 has a thickness in a range of about 12.5 μm to 47.2 μm. The total thickness of the medium 100 is about 166.6 μm.

Figure 6:
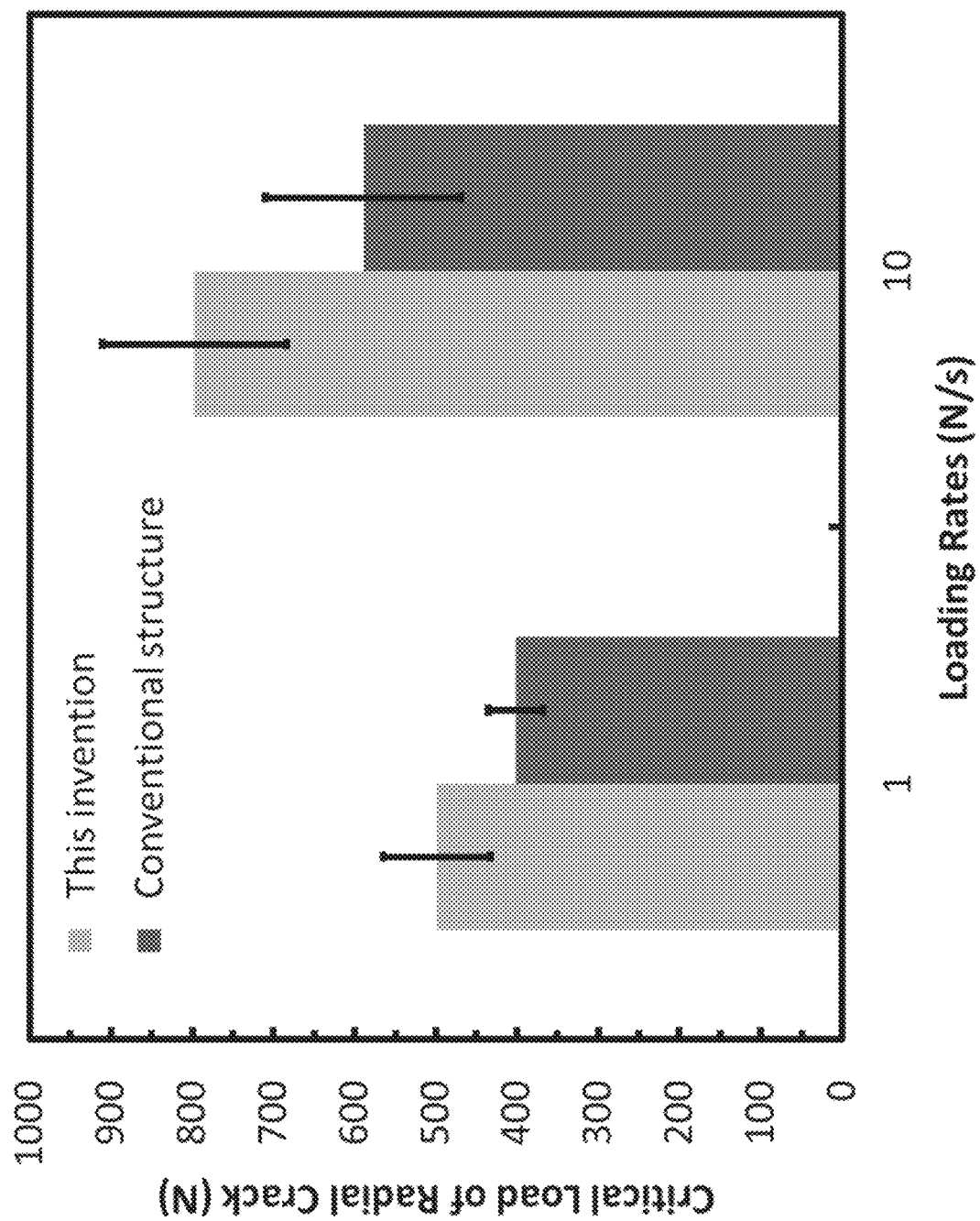
FIG. 6 is a graph showing the comparison of the mechanical properties of the medium of FIG. 1 and a conventional structure.

With reference to FIG. 6, there shows a graph representing a comparison of testing results of the medium 100 for a dental structure 200 in accordance with an embodiment of the present invention and a conventional structure without medium film. The bars in grey color represent testing results of the medium 100, and the bars in black color represent testing results of the conventional structure. In this experiment, different loadings with varying loading rates are applied on the two dental structures. The results show that the medium 100 for a dental structure 200 in accordance with an embodiment of the present invention may sustain a greater loading than the conventional structure in both 1 N/s or 10N/s loading rate conditions. Hence the medium 100 may effectively prevent cracks generations and/or propagation in a dental structure by acting as a stress releasing layer in the dental structure.

The above embodiments may be advantageous in that the medium for a dental structure may be used for a variety of dental and/or orthodontic applications, especially in restorative dental structures. The medium may be used as a transitional layer between the dentin layer and a ceramic dental component, such that the destructive stress established in the dental components may be minimized or released. By optimizing the physical properties in different layers, the medium may effectively catch or arrest the existing cracks in the ceramic dental component, and inhibit and deviate the propagation of these cracks so as to prevent the ceramic dental component, dentin and dental filling substrate being further damaged or even destroyed due to the extension of these cracks in the ceramic dental component. Therefore, the medium may extend the lifetime of the restorative dental structure or the ceramic dental component, and protect the entire restorative dental structure.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of producing a medium for a dental structure comprising the steps of:
   forming a first portion of the medium by:
      mixing inorganic fillers and a polymeric material with a first mixing ratio to form a first polymeric composite;
      depositing the first polymeric composite on either a first dental component or an existing intermediate layer of the medium to form a first portion of the medium, the first portion having a first mechanical property arranged to connect with a first dental component of the dental structure;
      curing the first portion of the medium;
   forming a second portion of the medium by:
      mixing inorganic fillers and a polymeric material with a second mixing ratio to form a second polymeric composite;
      depositing the second polymeric composite on either a second dental component of the existing intermediate layer of the medium to form a second portion of the medium, the second portion having a second mechanical property arranged to connect with a second dental component of the dental structure;
      curing the second portion of the medium;
   forming a third portion of the medium by:
      mixing inorganic fillers and a polymeric material with a third mixing ratio to form a third polymeric composite;
      depositing the third polymeric composite on wither a first portion of the medium, a second portion of the medium, or the existing intermediate layer to form an formed intermediate layer of the medium, such that the formed intermediate layer and all the existing intermediate layers combine to form the third portion of the medium, wherein the third portion of the medium includes a third mechanical property arranged to connect with a first portion of the medium and a second portion of the medium; the third mechanical property is either a constant through the thickness of the third portion or a series value changing along the thickness of the third portion;
      curing the third portion of the medium;
   wherein each of the first, second, and third mixing ratios are different from each other, such that the first, second and third mechanical properties are different from each other;
   wherein the combination of the first portion, the second portion, and the third portion is arranged to minimize stress in the first dental component when the first dental component combines with the second dental component via the medium, and wherein the mixing ratio gradually changes from the first portion to the third portion and then to the second portion such that there is a gradual change of the mixing ratios from the first portion to the sandwiched third portion and then to the second portion; and wherein the first mechanical property is gradually changed to the third mechanical property and then to the second mechanical property from the first portion to the third portion and then to the second portion of the medium.

2. The method of producing a medium in accordance with claim 1, further comprising the step of treating the inorganic fillers with a surface modifier prior to the step of mixing.

3. The method of producing a medium in accordance with claim 1, wherein said step of mixing is carried out by at least one of a high speed disperser, a three-roller miller and an ultra-sound homogenizer.

4. The method of producing a medium in accordance with claim 1, further comprising the step of degassing each of the polymer composites prior to depositing each of the polymeric composites.

5. The method of producing a medium in accordance with claim 1, wherein a polymeric composite includes a resin having a high strength property with at least one of a photon-curing, a heat-curing and a self-curing property.

* * * * *